(12) United States Patent
Srivatsa et al.

(10) Patent No.: US 10,580,112 B2
(45) Date of Patent: Mar. 3, 2020

(54) SCALABLE AND AREA EFFICIENT CONVERSION OF LINEAR IMAGE DATA INTO MULTI-DIMENSIONAL IMAGE DATA FOR MULTIMEDIA APPLICATIONS

(71) Applicant: QUALCOMM Incorporated, San Diego, CA (US)

(72) Inventors: Sandeep Nellikatte Srivatsa, Bangalore (IN); Anish Kumar, Bangalore (IN); Vikash Kumar, Bangalore (IN); Ashish Mishra, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/046,785

(22) Filed: Jul. 26, 2018

(65) Prior Publication Data

US 2020/0005426 A1 Jan. 2, 2020

Related U.S. Application Data

(60) Provisional application No. 62/691,760, filed on Jun. 29, 2018.

(51) Int. Cl.
*G09G 5/393* (2006.01)
*G06T 1/60* (2006.01)
*H04N 21/426* (2011.01)
*G06T 1/20* (2006.01)
(Continued)

(52) U.S. Cl.
CPC ............. *G06T 1/60* (2013.01); *G06T 1/20* (2013.01); *G09G 5/393* (2013.01); *H04N 19/423* (2014.11); *H04N 21/42692* (2013.01); *H04N 21/4435* (2013.01); *G09G 2360/122* (2013.01); *G09G 2360/123* (2013.01)

(58) Field of Classification Search
None
See application file for complete search history.

(56) References Cited

U.S. PATENT DOCUMENTS 5,990,912 A * 11/1999 Swanson ............. G06F 12/0207
345/531
6,064,407 A * 5/2000 Rogers ................ G06F 12/0207
345/568
(Continued)

*Primary Examiner* — Joni Richer
(74) *Attorney, Agent, or Firm* — Patterson & Sheridan, L.L.P.

(57) ABSTRACT

Certain aspects of the present disclosure provide techniques for scalably and efficiently converting linear image data into multi-dimensional image data for multimedia applications. In one example, a method for managing image data includes receiving a line of image data in a linear format via a system bus of width T, wherein the image data's native format is a tile format of H lines per tile; forming H subsets of image data from the line of image data in the linear format; writing the H subsets of image data to a memory comprising $B_N=H$ banks of $B_W=T/B_N$ pixel width, wherein each subset of the H subsets is written to a different bank of the $B_N$ banks; and outputting the H subsets of image data in the tile format.

27 Claims, 6 Drawing Sheets

(51) Int. Cl.
*H04N 21/443* (2011.01)
*H04N 19/423* (2014.01)

(56) References Cited

U.S. PATENT DOCUMENTS

2017/0004089 A1* 1/2017 Clemons ............. G06F 12/0893
2019/0042456 A1* 2/2019 Ginzburg ............ G06F 12/0893

* cited by examiner

SCALABLE AND AREA EFFICIENT CONVERSION OF LINEAR IMAGE DATA INTO MULTI-DIMENSIONAL IMAGE DATA FOR MULTIMEDIA APPLICATIONS

CROSS REFERENCE TO RELATED APPLICATIONS

This application claims the benefit of U.S. Provisional Patent Application 62/691,760, filed on Jun. 29, 2018, which is hereby incorporated by reference in its entirety.

INTRODUCTION

Aspects of the present disclosure relate to scalable and area efficient conversion of linear image data into multi-dimensional image data for multimedia applications.

Still images and video image frames are made up of elemental image data, such as pixels. Generally, pixel data that needs to be processed (e.g., encoded by a video rendering engine) may be stored in a linear or raster order in a memory of an electronic device (e.g., a DDR memory). However, pixel data processors, such as renderers and encoders, are generally configured to process image data in a multi-dimensional format, such as a two-dimensional rectangular (or "tile") format of W pixels in width and H pixels in height. Thus a conversion needs to be made between the linear or raster order image data and the multi-dimensional image format for processing. This conversion may implicate certain structural limitations of system components, such as system bus widths, system memory configurations, etc. Consequently, additional components may need to be added to a chip to handle the conversion, such as additional buffers and conversion circuitry. However, such additional components may require additional on-chip space and power, and may slow down overall processing of image data.

Accordingly, what is needed are methods to scalably and efficiently convert linear image data into multi-dimensional image data for multimedia applications.

BRIEF SUMMARY

In a first aspect, a method for managing image data, includes: receiving a line of image data in a linear format via a system bus of width T, wherein the image data's native format is a tile format of H lines per tile; forming H subsets of image data from the line of image data in the linear format; writing the H subsets of image data to a memory comprising $B_N$=H banks of $B_W$=T/$B_N$ pixel width, wherein each subset of the H subsets is written to a different bank of the $B_N$ banks; and outputting the H subsets of image data in the tile format.

In a second aspect, an apparatus for managing image data, includes: a memory comprising executable instructions; a processor in data communication with the memory and configured to execute the executable instructions in order to cause the apparatus to: receive a line of image data in a linear format via a system bus of width T, wherein the image data's native format is a tile format of H lines per tile; form H subsets of image data from the line of image data in the linear format; write the H subsets of image data to a memory comprising $B_N$=H banks of $B_W$=T/$B_N$ pixel width, wherein each subset of the H subsets is written to a different bank of the $B_N$ banks; and output the H subsets of image data in the tile format.

In a third aspect, a non-transitory computer-readable medium comprising instructions that when executed by a processor of a device, cause the device to perform a method for managing image data, the method including: receiving a line of image data in a linear format via a system bus of width T, wherein the image data's native format is a tile format of H lines per tile; forming H subsets of image data from the line of image data in the linear format; writing the H subsets of image data to a memory comprising $B_N$=H banks of $B_W$=T/$B_N$ pixel width, wherein each subset of the H subsets is written to a different bank of the $B_N$ banks; and outputting the H subsets of image data in the tile format.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for scalably and efficiently converting linear image data into multi-dimensional image data for multimedia applications.

In particular, by spreading image data across banks of a memory during a write cycle and thereafter rotating the data during a read cycle, the memory configuration and organization can be optimized for on-chip area, without compromising on performance.

In some examples, a number of memory banks, $B_N$, is configured to match the number of lines, H, in a multi-dimensional image format, such as a tile. For example, the number of lines in a multi-dimensional image format of 4 pixels wide by 4 pixels tall is H=4, and thus the number of memory banks is $B_N$=4. The data width of each bank, $B_W$, is configured based on the system data bus throughput of image data (T), for example the number of pixels that are written and read in a cycle. In one example, $B_W$=T/$B_N$. In this configuration, it is expected that all the banks are written/read during every valid write/read cycle.

Example Image Data Processing System

Figure 1:
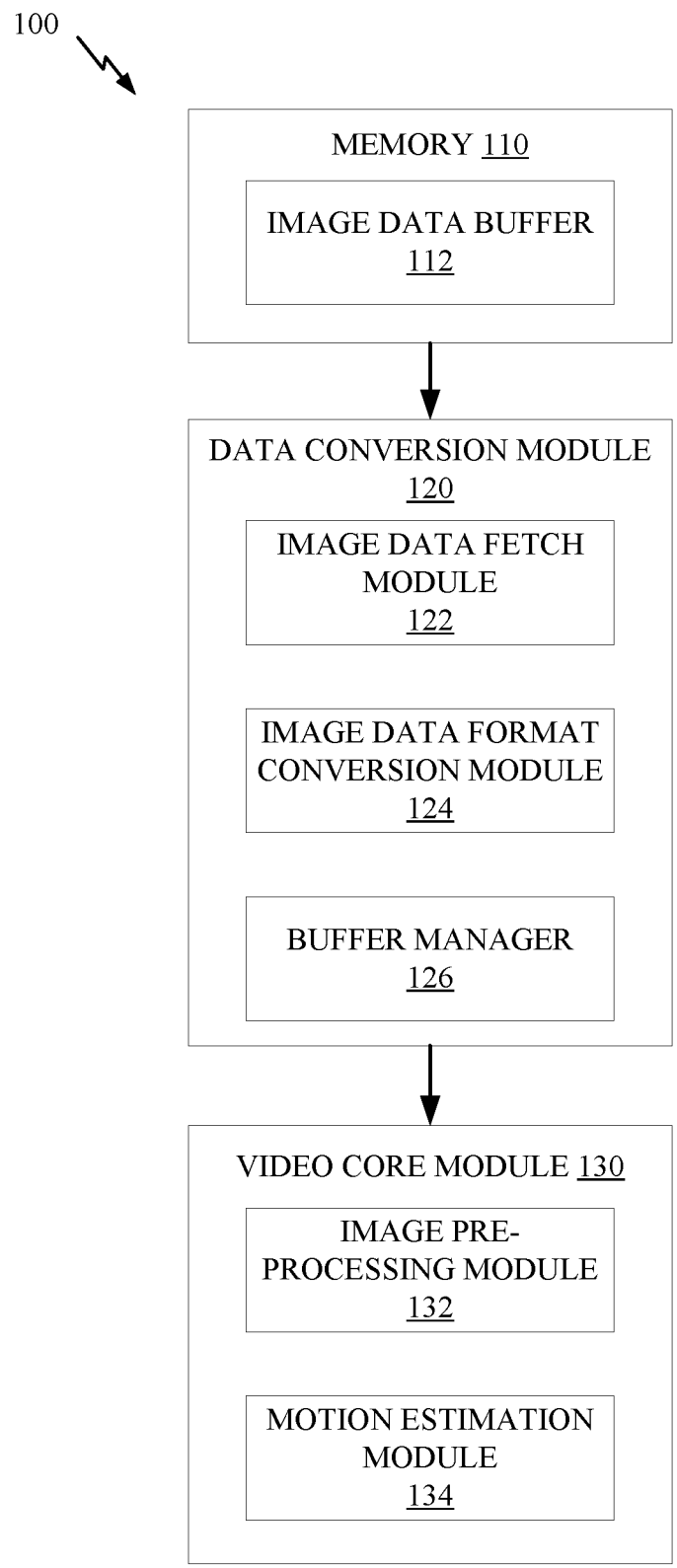
FIG. 1 depicts an example image data processing system.

FIG. 1 depicts an example image data processing system 100. Image data processing system 100 includes a memory 110 with an image data buffer 112. In some examples, image data within image data buffer 112 is stored in a linear format i.e., in a single dimensional format instead of a multi-dimensional format.

Memory 110 is connected to a data conversion module 120. Data conversion module 120 includes an image data fetch module 122, which is configured to fetch image data from image data buffer 112. For example, image data fetch module 122 is configured to fetch lines of linear image data from image data buffer 112. In some examples, image data fetch module fetches image data in line lengths that are consistent with the size of the system bus connecting memory 110 and data conversion module 120.

Data conversion module 120 also includes image data format conversion module 124, which is configured to convert linear format image data into multi-dimensional image data, such as image data tiles of W pixels in width and H pixels in height.

Data conversion module 120 also includes buffer manager 126, which manages the readout of converted image data to the video core module. For example, buffer manager 126 may read data converted by image data format conversion module 124 and provide it in a multi-dimensional format to video core module 130.

Data conversion module 120 is connected to video core module 130, which includes an image pre-processing module 132 and a motion estimation module 134. Image pre-processing module 132 and motion estimation module 134 are used by the video core module 130 to encode image data, for example, into a video stream. In other embodiments, video core module 130 might be replaced or supplemented by an image core module (not depicted), which may render image data instead of video data.

Conventional Image Data Management Method

Figure 2:
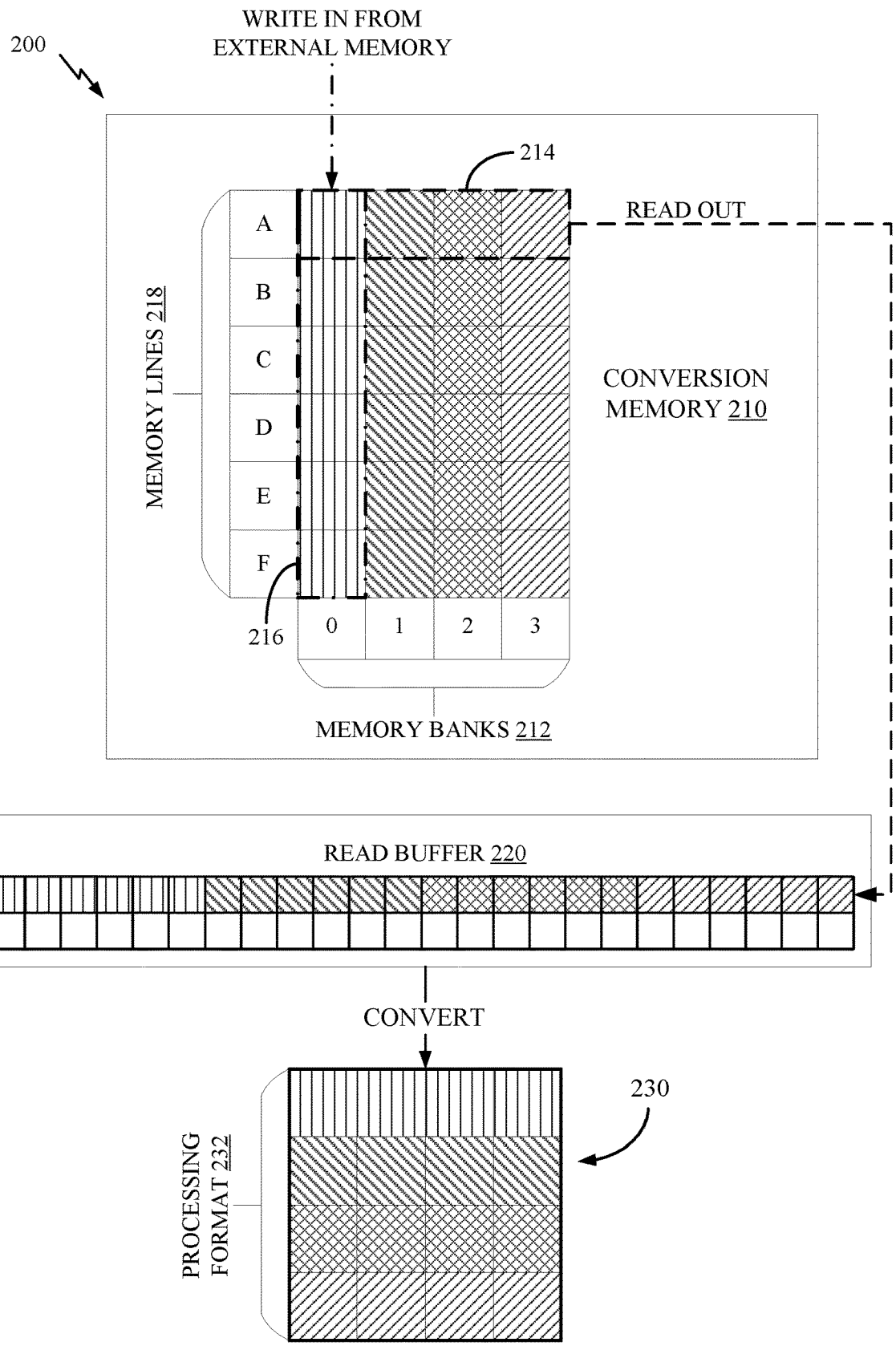
FIG. 2 depicts a conventional method of managing image data through a conversion process.

FIG. 2 depicts a conventional method 200 of managing image data through a conversion process. In particular, linear data from an external memory is written to a local memory 210 in order to be converted to a tile 230 in a multi-dimensional processing format 232.

In the depicted configuration, the number of memory banks 212 in memory 210 is based on the number of lines in the multi-dimensional image format 232 of tile 230. So in this example, there are four memory banks 212 because the multi-dimensional image format 232 includes four lines per tile 230. Memory 210 may be, for example, an SRAM memory.

Further in the depicted configuration, the data width of each memory bank 212 is based on the external data bus width (e.g., the bus over which the external memory is written into the memory banks). The bus width influences, for example, the amount of image data (e.g., the number of pixels) fetched in a read/write cycle from the external memory. Further, the depth of each memory bank 212 depends on the amount of data that needs to be pre-fetched to achieve a desired latency tolerance for external memory access.

The conventional method is to write data in a bank-wise fashion, i.e., one bank (e.g., bank 216) at a time. So as depicted, memory banks 0-3 include four separate sets of data written in (for example bursted) from an external memory, such as a DDR memory.

The conventional method is to read data in a line-wise fashion, i.e., one line (e.g., line 214) at a time. So as depicted, there are memory lines A-F, each line comprising data from each memory bank 0-3.

There are several shortcomings of the conventional method 200. First, there is a mismatch between the write and read bandwidth, which means that a read buffer 220 needs to be used. Read buffer 220 may be sized as T*H pixels, where T is the pixel transfer rate from the buffer (number of read/write pixels/clk) and H indicates the number of lines in a tile (e.g., tile 230). Notably, the addition of read buffer 220 creates additional on-chip area overhead and also requires additional power.

Second, in some cases an additional write buffer (not depicted) is necessary to handle write operations to the narrow memory 210. The addition of a write buffer may reduce the overall image data throughput according to the width of memory 210. And like read buffer 220, an additional write buffer creates additional on-chip area overhead and also requires additional power.

Third, inserting stalls onto the system bus while writing into a narrow, such as memory 210, without using an additional buffer, such as read buffer 220, may negatively impact performance of the overall system. Thus, implementing stalls to deal with bandwidth issues is not a desirable alternative.

Improved Image Data Management Method

Figure 3:
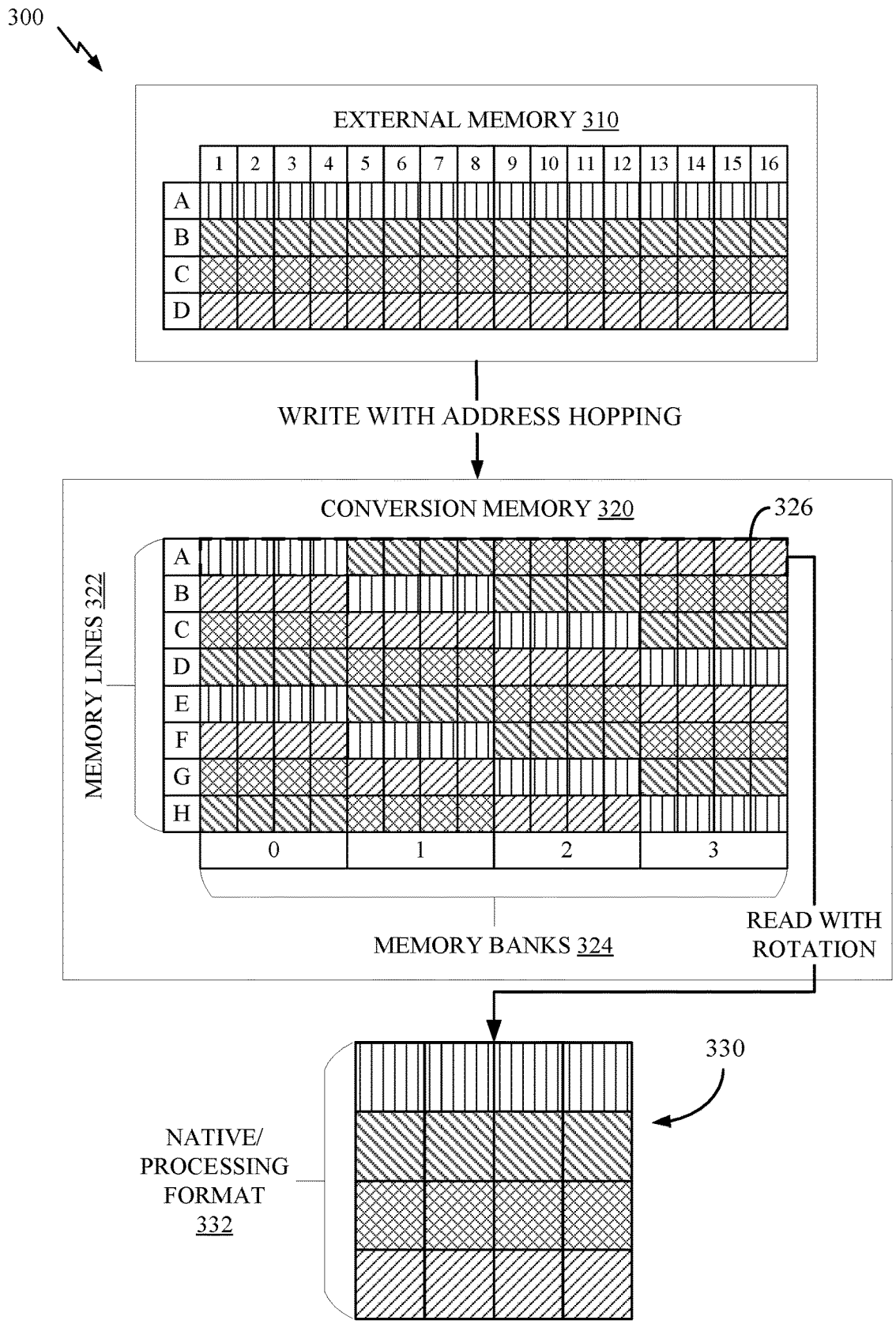
FIG. 3 depicts an improved method for scalably and efficiently converting linear image data into multi-dimensional image data for multimedia applications.

FIG. 3 depicts an improved method for scalably and efficiently converting linear image data into multi-dimensional image data for multimedia applications.

In particular, by spreading image data across banks of a memory during a write cycle and thereafter rotating the data during a read cycle, the memory configuration and organization can be optimized for reduced on-chip area, for example by eliminating the need for additional read and write buffers, without compromising on performance.

In the example depicted in FIG. 3, the number of memory banks, $B_N$, in conversion memory 320 is configured to match the number of lines, H, in the multi-dimensional image format of tile 330. In this example, tile 330 is 4 pixels wide by 4 pixels tall and thus is H=4 and the number of memory banks is $B_N$=4. The data width of each memory bank 324, $B_W$, is configured based on the system data bus throughput of image data (T), for example the number of pixels that are written and read in a cycle. In one example, $B_W$=T/$B_N$. So in this example, because the system bus (not depicted) is 128b wide and $B_N$=4, each memory bank 324 is 128 (T)/4 ($B_N$)=32b ($B_W$) wide.

In this example, conversion memory 320 is an SRAM, but in other examples, conversion memory 320 could be other types of memory. Conversion memory 320 can be a multi-port or single port SRAM. In the case of a single-port SRAM, where writes are given higher priority than reads, the depth of the memory needs to be increased due to stalls on reads (caused due to competing writes) in order to prevent stalls on system bus.

The depicted method still writes data in a bank-wise fashion, but in this method the pixel data is spread across the banks during the write cycle. For example, image data A1-A4 in external memory 310 is written to memory line A and memory bank 0 in conversion memory 320; image data A5-A8 in external memory 310 is written to memory line B and memory bank 1 in conversion memory 320; image data A9-A12 in external memory 310 is written to memory line C and memory bank 2 in conversion memory 320; and image data A13-A16 in external memory 310 is written to memory line D and memory bank 3 in conversion memory 320. Thus, during the write cycle, one address is hopped to from the next, rather than writing in a contiguous fashion as described with respect to FIG. 2.

The same pattern of address hopping applies to the other image data when writing from external memory 310 to conversion memory 320. For example, image data B1-B4 in external memory 310 is written to memory line A and memory bank 1 in conversion memory 320; image data B5-B8 in external memory 310 is written to memory line B and memory bank 2 in conversion memory 320; image data B9-B12 in external memory 310 is written to memory line C and memory bank 3 in conversion memory 320; and image data B13-B16 in external memory 310 is written to memory line D and memory bank 0 in conversion memory 320. The same pattern applies to the other image data in external memory that is written into conversion memory 320.

By storing the image data in conversion memory according to the address hopping scheme discussed above, the image data is able to be read out of conversion memory 320 in the conventional line-wise fashion. For example, the data 326 in memory line A of conversion memory 320 can be read out in a single line to create tile 330 in the native processing format 332. For example, the image data in memory line A and bank 0 of conversion memory 320 becomes the first line of multi-dimensional data in tile 330; the image data in memory line A and bank 1 of conversion memory 320 becomes the second line of multi-dimensional data in tile 330; the image data in memory line A and bank 2 of conversion memory 320 becomes the third line of multi-dimensional data in tile 330; and the image data in memory line A and bank 3 of conversion memory 320 becomes the fourth line of multi-dimensional data in tile 330. When moving to line B, a rotation occurs because of the order that the data is stored in line B due to the address hopping during the write cycle (discussed above). For example, the image data in memory line B and bank 0 of conversion memory 320 becomes the fourth line of multi-dimensional data in tile 330; the image data in memory line B and bank 1 of conversion memory 320 becomes the first line of multi-dimensional data in tile 330; the image data in memory line B and bank 2 of conversion memory 320 becomes the second line of multi-dimensional data in tile 330; and the image data in memory line B and bank 3 of conversion memory 320 becomes the third line of multi-dimensional data in tile 330.

Figure 4:
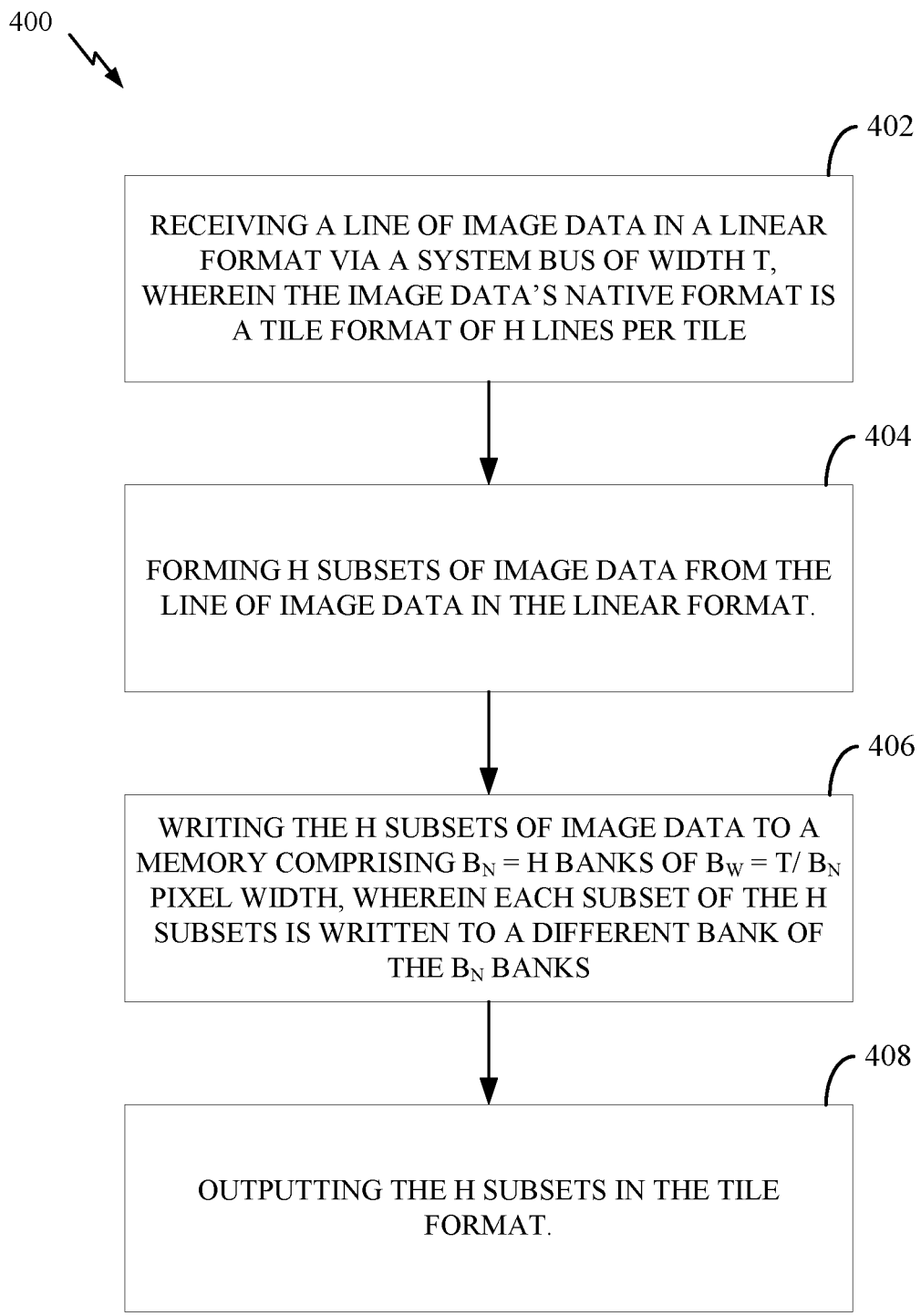
FIG. 4 depicts a method of managing image data.

FIG. 4 depicts a method of managing image data 400. Method 400 begins at step 402 with receiving a line of image data in a linear format via a system bus of width T, wherein the image data's native format is a tile format of H lines per tile. In some examples, the image data is from one of: a still image; or a moving image frame of a video.

Method 400 then proceeds to step 404 with forming H subsets of image data from the line of image data in the linear format.

Method 400 then proceeds to step 406 with writing the H subsets of image data to a memory comprising $B_N$=H banks of $B_W$=T/$B_N$ pixel width, wherein each subset of the H subsets is written to a different bank of the $B_N$ banks. In some examples, writing the H subsets of image data to the memory occurs in a single write cycle.

Method 400 then proceeds to step 408 with outputting the H subsets of image data in the tile format.

In some embodiments of method 400, writing the H subsets of image data further includes: writing each of the H subsets of image data into different banks and lines in the memory. In some examples, each of the H subsets of the image data comprises image data in a single line of an image.

In some embodiments of method 400 outputting the H subsets of image data in the tile format further includes: reading H subsets of image data from $B_N$ banks of a single line in the memory; and rearranging the H subsets of image data from the $B_N$ banks of a single line in the memory to place the H subsets of image data in the tile format. In some examples, outputting the H subsets of image data in the tile format occurs in a single read cycle. In some examples, each of the H subsets of the image data from the $B_N$ banks of the single line in the memory comprises image data of different lines of an image.

Method 400 may be particularly useful for devices running multimedia applications where image data (including still image and video image data) are being processed (e.g., encoded, decoded, rendered, etc.).

Example Algorithms for Write and Read Operations

The following is an example of an algorithm for writing image data from an external memory, such as external memory 310, to an image data processing memory, such as conversion memory 320:

```
line_idx = 0
While (line_idx < Total_lines_in_Tile) {
  Beat_idx = 0
  While (input_write_valid && beat_idx < Total_beats_in_burst) {
  //input_write_valid indicates valid input_wr_data in the current cycle
    bank_idx = 0
    While (bank_idx < Total_lines_in Tile) {
      wr_addr_offset = (line_idx > bank_idx) ?
      (Total_lines_in_Tile + (bank_idx - line_idx)) : (bank_idx
      - line_idx);
      bank_wr_address[bank_idx] = beat_idx *
      Total_lines_in_Tile + wr_addr_offset;
      bank_wr_data[bank_idx] =
      input_write_data[((W*wr_addr_offset)+(W-1)):
      (W*wr_addr_offset)]; //wr_addr_offset varies from 0 to
      (Total_lines_in_Tile-1), W = Bank_Data_Width
      bank_idx++;
    }
    beat_idx++;
  }
line_idx++;
}
```

The following is an example of an algorithm for reading image data from an image data processing memory, such as conversion memory 320, using read rotation as described above:

```
Beat_idx = 0;
While (beat_idx < Total_beats_in_burst) {
  tile_idx=0;
  While (input_tile_read_valid && tile_idx < Total_lines_in_Tile) {
  //input_read_valid indicates valid tile read command in the current cycle.
```

-continued

```
    bank_rd_address = beat_idx * Total_lines_in_Tile + tile_idx;
    bank_idx = 0
    While (bank_idx < Total_lines_in_Tile) {
        rd_addr_offset = (bank_idx + tile_idx) %
        Total_lines_in_Tile; // % indicated modulo operation
        output_tile_data[((W*rd_addr_offset)+(W-
        1))+(W*rd_addr_offset)] = bank_rd_data[W-1:0];
        //In output_tile_data, LS W bits has line 0 of tile, whereas
        MS W bits has last line of tile.
        bank_idx++;
      }
      tile_idx++;
    }
    beat_idx++;
}
```

Notably, these are just two examples of possible algorithms for writing and reading image data according to the methods described herein. Others are possible.

Example Performance Improvements

Figure 5A:
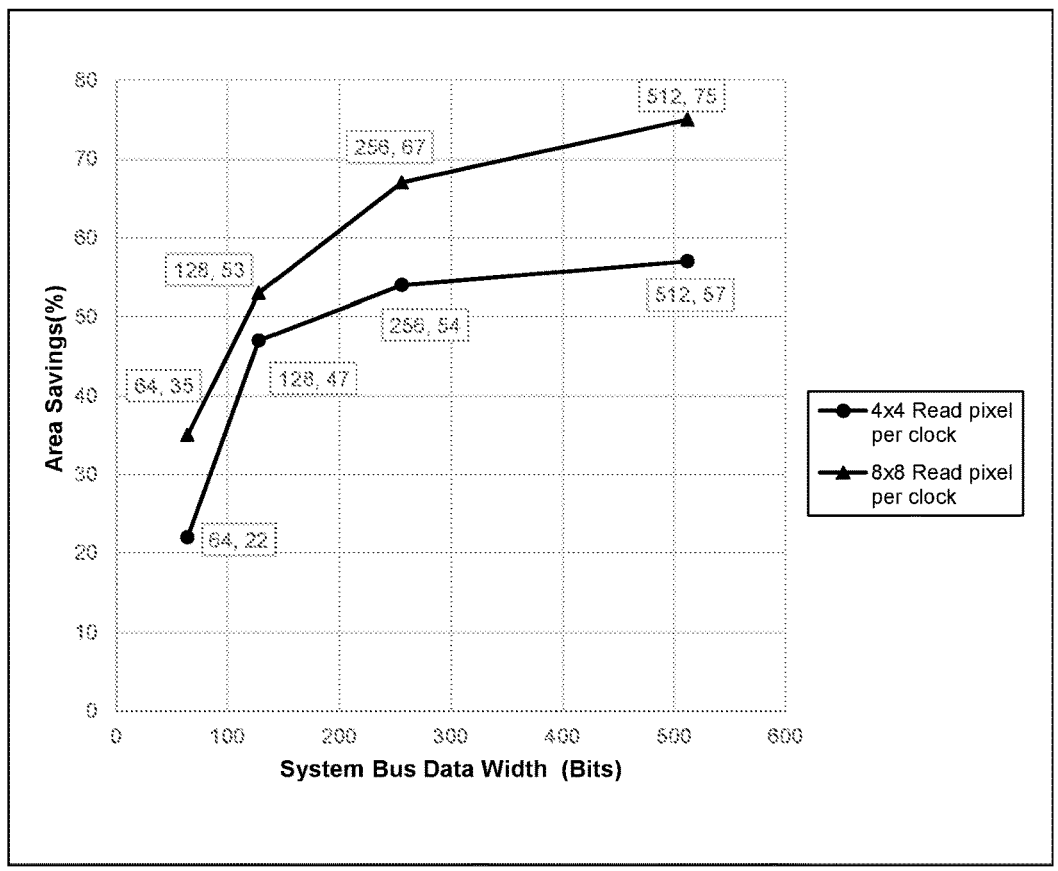
FIG. 5A depicts an example of on-chip memory area savings achieved when implementing the systems and methods described herein.

FIG. 5A depicts an example of on-chip memory area savings achieved when implementing the systems and methods described herein, such as with respect to FIGS. 3 and 4. In particular, FIG. 5A shows the improvement over conventional conversion memory configurations (such as described with respect to FIG. 2) for given system bus data widths (along the horizontal axis). As shown, the area savings are significant, which may beneficially reduce system size and power demands.

The following tables summarize the depicted data:

TABLE 1

Area Performance Improvements for 4 × 4 Tiles

| | System bus data Width (bits) | Conventional Memory Configuration (No. of Banks × (Height × Width in bits) | Area in 10 nm Tech (μm²) | Improved Memory Configuration (No. of Banks × (Height × Width in bits) | Area in 10 nm Tech (μm²) | Area Savings (%) |
|---|---|---|---|---|---|---|
| 1 | 64 | 4 × (256 × 64) | 8876 | 4 × (1024 × 16) | 6940 | 21.81 |
| 2 | 128 | 4 × (128 × 128) | 13344 | 4 × (512 × 32) | 7040 | 47.24 |
| 3 | 256 | 4 × (64 × 256) | 19136 | 4 × (256 × 64) | 8876 | 53.61 |
| 4 | 512 | 4 × (32 × 512) | 31328 | 4 × (128 × 128) | 13344 | 57.40 |

TABLE 2

Area Performance Improvements for 8 × 8 Tiles

| | System bus data Width (bits) | Conventional Memory Configuration (No. of Banks × (Height × Width in bits) | Area in 10 nm Tech (μm²) | Improved Memory Configuration (No. of Banks × (Height × Width in bits) | Area in 10 nm Tech (μm²) | Area Savings (%) |
|---|---|---|---|---|---|---|
| 1 | 64 | 8 × (128 × 64) | 14016 | 8 × (1024 × 8) | 9064 | 35.33 |
| 2 | 128 | 8 × (64 × 128) | 19136 | 8 × (512 × 16) | 9064 | 52.63 |
| 3 | 256 | 8 × (32 × 256) | 31328 | 8 × (256 × 32) | 10280 | 67.18 |
| 4 | 512 | 8 × (16 × 512) | 55936 | 8 × (128 × 64) | 14016 | 74.94 |

Figure 5B:
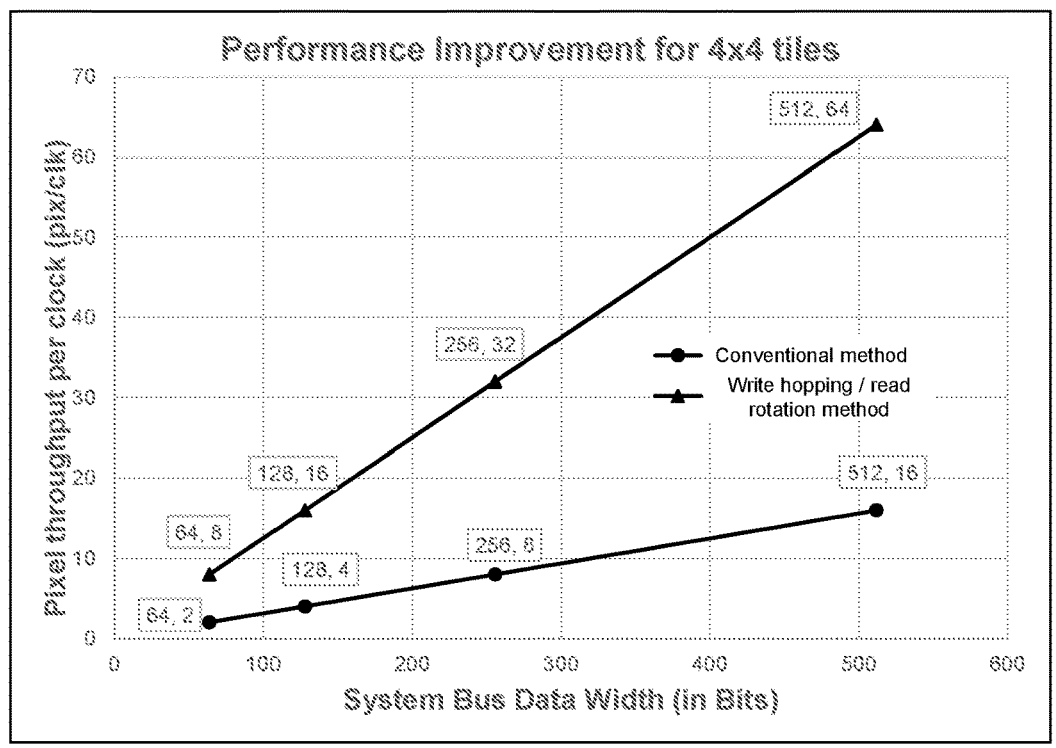
FIG. 5B depicts an example of image data throughput performance improvement achieved when implementing the systems and methods described herein.

FIG. 5B depicts an example of image data throughput performance improvement achieved when implementing the systems and methods described herein, such as with respect to FIGS. 3 and 4. In particular, FIG. 5B shows the improvement over conventional conversion memory configurations (such as described with respect to FIG. 2) for given system bus data widths (along the horizontal axis). As shown, the performance improvements are again significant, which may beneficially increase system speed and responsiveness.

The following tables summarize the depicted data:

TABLE 3

Throughput Improvement for 4 × 4 Tiles

| | System bus data width (bits) | Memory Configuration (No. of Banks × (Height × Width in bits) | Image data throughput in conventional scheme (Pixel/clk, where 1 pixel = 8 bits) | Image data throughput in improved scheme (Pixel/clk, where 1 pixel = 8 bits) | Throughput improvement (%) |
|---|---|---|---|---|---|
| 1 | 64 | 4 × (1024 × 16) | 2 | 8 | 300 |
| 2 | 128 | 4 × (512 × 32) | 4 | 16 | 300 |
| 3 | 256 | 4 × (256 × 64) | 8 | 32 | 300 |
| 4 | 512 | 4 × (128 × 128) | 16 | 64 | 300 |

TABLE 4

Throughput Improvement for 8 × 8 Tiles

| | System bus data width (bits) | Memory Configuration | Image data throughput in conventional scheme (Pixel/clk where 1 pixel = 8 bits) | Image data throughput in improved scheme (Pixel/clk where 1 pixel = 8 bits) | Throughput improvement (%) |
|---|---|---|---|---|---|
| 1 | 64 | 8 × (1024 × 8) | 1 | 8 | 700 |
| 2 | 128 | 8 × (512 × 16) | 2 | 16 | 700 |
| 3 | 256 | 8 × (256 × 32) | 4 | 32 | 700 |
| 4 | 512 | 8 × (128 × 64) | 8 | 64 | 700 |

Notably, these results are merely examples, and other configurations may achieve different results.

Example Processing System

Figure 6:
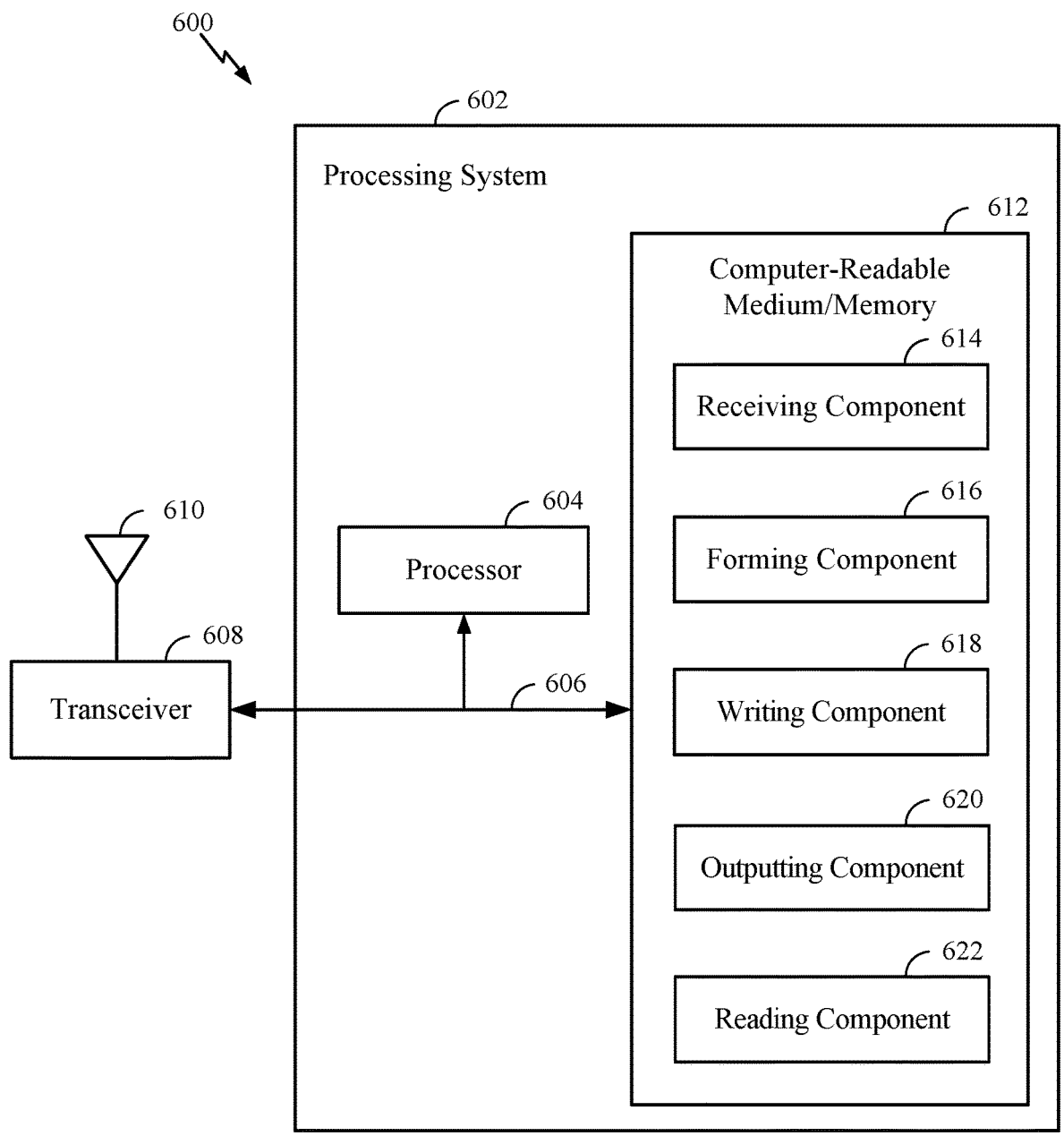
FIG. 6 depicts an example communication device.

FIG. 6 illustrates a communications device 600 that may include various components (e.g., corresponding to means-plus-function components) configured to perform operations for the techniques disclosed herein, such as the operations illustrated in FIGS. 3 and 4. The communications device 600 includes a processing system 602 coupled to a transceiver 608. The transceiver 608 is configured to transmit and receive signals for the communications device 600 via an antenna 610, such as the various signal described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions that when executed by processor 604, cause the processor 604 to perform the operations illustrated in FIGS. 3 and 4, or other operations for performing the various techniques discussed herein.

In certain aspects, the processing system 602 further includes a receiving component 614 for performing the operations illustrated in FIGS. 3 and 4. Additionally, the processing system 602 includes a forming component 616 for performing the operations illustrated in FIGS. 3 and 4. Additionally, the processing system 602 includes a writing component 618 for performing the operations illustrated in FIGS. 3 and 4. Additionally, the processing system 602 includes an outputting component 620 for performing the operations illustrated in FIGS. 3 and 4. Additionally, the processing system 602 includes a reading component 622 for performing the operations illustrated in FIGS. 3 and 4.

The receiving component 614, forming component 616, writing component 618, and outputting component 620 may be coupled to the processor 604 via bus 606. In certain aspects, the receiving component 614, forming component 616, writing component 618, outputting component 620, and reading component 622 may be hardware circuits. In certain aspects, the receiving component 614, forming component 616, writing component 618, outputting component 620, and reading component 622 may be software components that are executed and run on processor 604.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for managing image data, comprising:
   receiving a line of image data in a linear format via a system bus of width T, wherein the image data's native format is a tile format of H lines per tile;
   forming H subsets of image data from the line of image data in the linear format;
   writing the H subsets of image data, in a single write cycle, to a memory comprising $B_N$=H banks of $B_W$=T/$B_N$ pixel width, wherein each subset of the H subsets of image data is written to a different bank of the $B_N$ banks; and
   outputting the H subsets of image data in the tile format.

2. The method of claim 1, wherein the image data is from one of:
   a still image; or
   a moving image frame of a video.

3. The method of claim 1, wherein writing the H subsets of image data further comprises: writing each subset of the H subsets of image data into different banks and lines in the memory.

4. The method of claim 3, wherein each subset of the H subsets of image data comprises image data in a single line of an image.

5. The method of claim 1, wherein outputting the H subsets of image data in the tile format further comprises:
   reading the H subsets of image data from $B_N$ banks of a single line in the memory; and
   rearranging the H subsets of image data from the $B_N$ banks of the single line in the memory to place the H subsets of image data in the tile format.

6. The method of claim 5, wherein outputting the H subsets of image data in the tile format occurs in a single read cycle.

7. The method of claim 5, wherein each subset of the H subsets of image data from the $B_N$ banks of the single line in the memory comprises image data of different lines of an image.

8. An apparatus for managing image data, comprising:
   a memory comprising executable instructions;
   a processor in data communication with the memory and configured to execute the executable instructions in order to cause the apparatus to:
   receive a line of image data in a linear format via a system bus of width T, wherein the image data's native format is a tile format of H lines per tile;
   form H subsets of image data from the line of image data in the linear format;
   write the H subsets of image data, in a single write cycle, to a memory comprising $B_N$=H banks of $B_W$=T/$B_N$ pixel width, wherein each subset of the H subsets of image data is written to a different bank of the $B_N$ banks; and
   output the H subsets of image data in the tile format.

9. The apparatus of claim 8, wherein the image data is from one of:
   a still image; or
   a moving image frame of a video.

10. The apparatus of claim 8, wherein in order to write the H subsets of image data, the apparatus is further configured to: write each subset of the H subsets of image data into different banks and lines in the memory.

11. The apparatus of claim 10, wherein each subset of the H subsets of image data comprises image data in a single line of an image.

12. The apparatus of claim 8, wherein in order to output the H subsets of image data in the tile format, the apparatus is further configured to:
read the H subsets of image data from $B_N$ banks of a single line in the memory; and
rearrange the H subsets of image data from the $B_N$ banks of the single line in the memory to place the H subsets of image data in the tile format.

13. The apparatus of claim 12, wherein the apparatus is configured to output the H subsets of image data in the tile format during a single read cycle.

14. The apparatus of claim 12, wherein each subset of the H subsets of image data from the $B_N$ banks of the single line in the memory comprises image data of different lines of an image.

15. A non-transitory computer-readable medium comprising instructions that when executed by a processor of a device, cause the device to perform a method for managing image data, the method comprising:
receiving a line of image data in a linear format via a system bus of width T, wherein the image data's native format is a tile format of H lines per tile;
forming H subsets of image data from the line of image data in the linear format;
writing the H subsets of image data, in a single write cycle, to a memory comprising $B_N$=H banks of $B_W$=T/$B_N$ pixel width, wherein each subset of the H subsets of image data is written to a different bank of the $B_N$ banks; and
outputting the H subsets of image data in the tile format.

16. The non-transitory computer-readable medium of claim 15, wherein the image data is from one of:
a still image; or
a moving image frame of a video.

17. The non-transitory computer-readable medium of claim 15, wherein writing the H subsets of image data further comprises: writing each subset of the H subsets of image data into different banks and lines in the memory.

18. The non-transitory computer-readable medium of claim 17, wherein each subset of the H subsets of image data comprises image data in a single line of an image.

19. The non-transitory computer-readable medium of claim 15, wherein outputting the H subsets of image data in the tile format further comprises:
reading the H subsets of image data from $B_N$ banks of a single line in the memory; and
rearranging the H subsets of image data from the $B_N$ banks of the single line in the memory to place the H subsets of image data in the tile format.

20. The non-transitory computer-readable medium of claim 19, wherein outputting the H subsets of image data in the tile format occurs in a single read cycle.

21. The non-transitory computer-readable medium of claim 19, wherein each subset of the H subsets of image data from the $B_N$ banks of the single line in the memory comprises image data of different lines of an image.

22. An apparatus for managing image data, comprising:
means for receiving a line of image data in a linear format via a system bus of width T, wherein the image data's native format is a tile format of H lines per tile;
means for forming H subsets of image data from the line of image data in the linear format;
means for writing the H subsets of image data, in a single write cycle, to a memory comprising $B_N$=H banks of $B_W$=T/$B_N$ pixel width, wherein each subset of the H subsets of image data is written to a different bank of the $B_N$ banks; and
means for outputting the H subsets of image data in the tile format.

23. The apparatus of claim 22, wherein the image data is from one of:
a still image; or
a moving image frame of a video.

24. The apparatus of claim 22, wherein in order to write the H subsets of image data, the apparatus is further configured to: write each subset of the H subsets of image data into different banks and lines in the memory.

25. The apparatus of claim 24, wherein each subset of the H subsets of image data comprises image data in a single line of an image.

26. The apparatus of claim 22, wherein means for outputting the H subsets of image data in the tile format is further configured for:
reading the H subsets of image data from $B_N$ banks of a single line in the memory; and
rearranging the H subsets of image data from the $B_N$ banks of the single line in the memory to place the H subsets of image data in the tile format.

27. The apparatus of claim 26, wherein each subset of the H subsets of image data from the $B_N$ banks of the single line in the memory comprises image data of different lines of an image.

* * * * *